(12) United States Patent
Shibata (10) Patent No.: US 8,557,465 B2
(45) Date of Patent: Oct. 15, 2013

(54) FUEL CELL INCLUDING A LIQUID DISCHARGE MECHANISM

(75) Inventor: Kazunori Shibata, Mishima (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 559 days.

(21) Appl. No.: 12/524,926

(22) PCT Filed: Feb. 6, 2008

(86) PCT No.: PCT/JP2008/051929
§ 371 (c)(1),
(2), (4) Date: Jul. 29, 2009

(87) PCT Pub. No.: WO2008/096780
PCT Pub. Date: Aug. 14, 2008

(65) Prior Publication Data
US 2010/0009239 A1  Jan. 14, 2010

(30) Foreign Application Priority Data
Feb. 9, 2007  (JP) .................................. 2007-030349

(51) Int. Cl.
*H01M 8/02* (2006.01)
*H01M 8/10* (2006.01)

(52) U.S. Cl.
USPC ........................... 429/456; 429/483; 429/455

(58) Field of Classification Search
USPC .................. 429/452, 444, 434, 483, 455, 456
See application file for complete search history.

(56) References Cited

U.S. PATENT DOCUMENTS
2004/0110057 A1   6/2004   Yoshimoto et al.

FOREIGN PATENT DOCUMENTS

| | | |
|---|---|---|
| JP | 7 320753 | 12/1995 |
| JP | 7 326373 | 12/1995 |
| JP | 2000 149966 | 5/2000 |
| JP | 2001 110432 | 4/2001 |
| JP | 2003 151585 | 5/2003 |
| JP | 2004 185944 | 7/2004 |
| JP | 2004207041 A * | 7/2004 |
| JP | 2004 327358 | 11/2004 |
| JP | 2005 285636 | 10/2005 |
| JP | 2005 302455 | 10/2005 |
| JP | 2006-4803 | 1/2006 |
| WO | WO 2010/099932 A1 | 9/2010 |

OTHER PUBLICATIONS

Machine Translation of: JP 2004/207041 A, Yoshimoto et al., Jul. 2004.*
Extended European Search Report issued Mar. 5, 2012, in Patent Application No. 08710834.6.

* cited by examiner

*Primary Examiner* — Kenneth Douyette
(74) *Attorney, Agent, or Firm* — Oblon, Spivak, McClelland, Maier & Neustadt, L.L.P.

(57) ABSTRACT

A fuel cell includes: a first discharge mechanism that connects an inlet of a discharge flow path directly to a porous body so as to cause liquid in the porous body and liquid in the discharge flow path to be continuous, thereby discharging the liquid in preference to the offgas; and a second discharge mechanism that connects an inlet of a discharge flow path to the porous body via a hollow portion of a predetermined size to prevent liquid in the porous body and liquid in the discharge flow path from becoming continuous, thereby discharging the offgas in preference to the liquid. The fuel cell is easy-to-manufacture with long-lasting effectiveness, and is capable of separating and discharging offgas and liquid in a porous body.

9 Claims, 6 Drawing Sheets

FUEL CELL INCLUDING A LIQUID DISCHARGE MECHANISM

TECHNICAL FIELD OF THE INVENTION

The present invention relates to a technique of discharging offgas and liquid in a fuel cell.

BACKGROUND ART

As a flow path for discharging offgas and water in a porous body of a fuel cell, there is a discharge flow path that employs a pectinated member (see Patent Document 1).

There are also techniques for separating and discharging offgas and water, including a technique of arranging a water repellent member and a water immersible member in a downstream part of a porous body, a technique of enlarging the cross-sectional area of a flow path in a cathode side downstream part to reduce a flow rate and thereby cause water to be accumulated therein, and a technique of providing a small-diameter hole as a water flow path and a large-diameter hole as a gas flow path in a porous body (see Patent Documents 2, 3, and 4).

Patent Document 1: Japanese Unexamined Patent Publication No. H07-326373
Patent Document 2: Japanese Unexamined Patent Publication No. 2000-149966
Patent Document 3: Japanese Unexamined Patent Publication No. 2005-285636
Patent Document 4: Japanese Unexamined Patent Publication No. H07-320753

SUMMARY OF THE INVENTION

Problem to be Solved by the Invention

Along with generation of power by a fuel cell, there will be offgas, water, and the like to be accumulated in a porous body that is arranged around a membrane electrode assembly (MEA) of the fuel cell. It is thus necessary to discharge the offgas, water, and the like in the porous body out of the fuel cell. However, conventionally, there has been a problem that discharging of offgas is prevented because of accumulation of water in discharge flow paths. In particular, when most of the discharge flow paths are blocked due to clogging by the water, the offgas in the fuel cell may possibly remain not discharged, resulting in too much residual offgas amount.

One conceivable method separates offgas and water by controlling porosity in a porous body during manufacturing process of the porous body. However, there is difficulty in manufacturing such porous body. Another proposed method separates offgas and water by processing a surface of a porous body to be water repellant or water immersible. However, such surface processing may possibly loose its effectiveness due to temporal change, and thus may be difficult to ensure long-lasting effectiveness.

In view of the aforementioned problems, the present invention is purposed to provide an easy-to-manufacture fuel cell with long-lasting effectiveness, that is capable of separating and discharging offgas and liquid in a porous body.

Means for Solving the Problem

In order to achieve the aforementioned purpose, the present invention enabled separation and discharging of offgas and liquid in a porous body, by preventing liquid in the porous body and liquid in a discharge flow path from becoming continuous due to viscosity of liquid.

In detail, the present invention relates to a fuel cell that includes:

a porous body disposed on a surface of a membrane electrode assembly, the porous body being a porous member so as to configure a flow path for reaction gas;

a plurality of discharge flow paths connected to the porous body, the plurality of discharge flow paths allowing passage of offgas and liquid discharged from within the porous body;

a first discharge means provided at a location where each of some of the plurality of discharge flow paths is connected to the porous body, the first discharge means causing liquid in the porous body and liquid in the discharge flow path to be continuous due to viscosity of liquid, thereby discharging the liquid in the porous body in preference to the offgas; and a second discharge means provided at a location where each of the discharge flow paths other than the some of the plurality of discharge flow paths provided with the first discharge means is connected to the porous body, the second discharge means preventing liquid in the porous body and liquid in the discharge flow path from becoming continuous due to viscosity of liquid, thereby discharging the offgas in preference to the liquid in the porous body.

The porous body is a porous member, so that spaces in the porous body configure flow paths for reaction gas and thereby diffuse the reaction gas across the surface of the membrane electrode assembly. Furthermore, the porous body retains products including offgas and liquid such as product water, that may be produced along with generation of power by the fuel cell. Also note that the flow paths are such configurations that are provided for discharging liquid and offgas in the porous body.

The present invention provides the first discharge means for preferential discharge of liquid and the second discharge means for preferential discharge of offgas at locations where the discharge flow paths and the porous body are connected, thereby allowing for separation and discharging of liquid and offgas.

That is, according to the present invention, liquid and offgas are discharged by different paths so that a path for discharge of offgas can be ensured. In this way, it is possible to solve the problem that most of the discharge flow paths are blocked by liquid with too much offgas remaining in the porous body.

Additionally, in the present invention, the first discharge means may connect an inlet of the discharge flow path directly to the porous body, thereby causing liquid in the porous body and liquid in the discharge flow path to be continuous due to viscosity of liquid; whereas the second discharge means may connect an inlet of the discharge flow path to the porous body via a hollow portion of a predetermined size, thereby preventing liquid in the porous body and liquid in the discharge flow path from becoming continuous due to viscosity of liquid.

By connecting an inlet of the discharge flow path to the porous body via a hollow portion, it is possible to break continuousness of liquid in the hollow portion, thereby ensuring a path for preferential discharge of offgas. Thus, the hollow portion has such a size that can prevent liquid of an amount of general existence in the porous body from becoming continuous due to its viscosity.

Additionally, in the present invention, the second discharge means may connect the discharge flow path to the porous body via a hollow portion that is emerged by a notch provided on the surface of the porous body, or alternatively, via a hollow portion that is emerged by a concave portion provided in the vicinity of the inlet of the discharge flow path.

By adopting such configuration that forms a hollow portion as a notch provided at the porous body or as a concave portion provided in the vicinity of the inlet of the discharge flow path, it is possible to manufacture, with ease, a fuel cell that is capable of ensuring a path for preferential discharge of offgas.

In the present invention, the first discharge means and the second discharge means may be arranged in a uniformly distributed manner with respect to the plurality of discharge flow paths.

It is preferable that the first discharge means and the second discharge means be arranged in a uniformly distributed manner, such as provided alternately with respect to the plurality of discharge flow paths, for example, rather than lopsided to those discharge flowpaths in a specific area. With such arrangement, it is possible to discharge offgas and liquid from within the porous body in an appropriately-balanced manner, rather than discharging either one of them too much or too less.

In the present invention, the first discharge means and the second discharge means may connect the discharge flow paths to the porous body on an oxidation gas electrode side.

During generation of power by the fuel cell, water is produced on the oxidation gas electrode side. Thus, it is preferable that the first discharge means and the second discharge means be provided on the oxidation gas electrode side. However, the first discharge means and the second discharge means may also be provided on a fuel gas electrode side, since there may be water content supplied along with fuel gas, product water seeped from the oxidation gas electrode side, and the like, to be accumulated on the fuel gas electrode side.

Effect of the Invention

With the present invention, it is possible to provide a fuel cell that is capable of separating and discharging offgas and liquid in a porous body.

BEST MODE FOR EMBODYING THE INVENTION

Modes for embodying a fuel cell according to the present invention will now be described based on the drawings.

Figure 1:
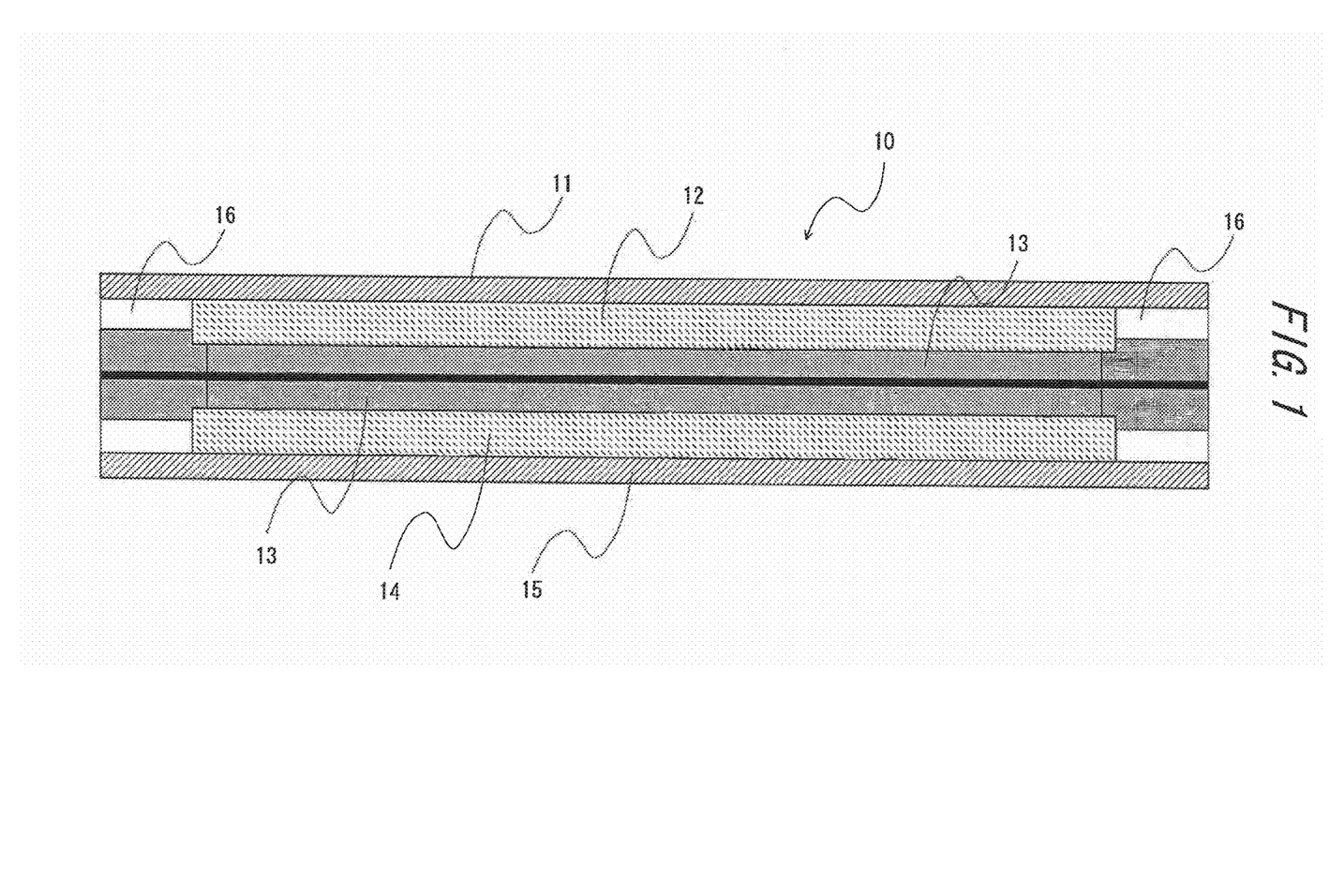
FIG. 1 is a cross-sectional view showing the schematic configuration of a fuel cell in an embodiment.

FIG. 1 is a cross-sectional view showing the schematic configuration of a fuel cell 10 in an embodiment. The fuel cell 10 is comprised of a cathode side separator 11, a cathode side porous body 12, a membrane electrode assembly 13, an anode side porous body 14, and an anode side separator 15 that are laminated in sequence, and generates power by promoting electrochemical reaction of supplied reaction gases in the membrane electrode assembly 13. The reaction gases are fuel gas supplied from a fuel tank not shown and oxidation gas obtained and supplied from outside air. The oxidation gas is supplied to the cathode side porous body 12; whereas the fuel gas is supplied to the anode side porous body 14.

The porous bodies 12, 14 configure flow paths for diffusing the supplied fuel gas and oxidation gas across the surfaces of the membrane electrode assembly 13. The cathode side porous body 12 is a flow path for the oxidation gas; whereas the anode side porous body 14 is a flow path for the fuel gas. Additionally, the porous bodies 12, 14 retain products therein, such as product water and offgas, that will be produced in the membrane electrode assembly 13 along with generation of power. The separators 11, 15 prevent gas and liquid in the porous bodies 12, 14 from seeping to outside.

The fuel cell 100 further includes a discharge flow path 16. The discharge flow path 16 is a flow path for discharging offgas and liquid (not necessarily product water) in the cathode side porous body 12 to outside of the cathode side porous body 12.

FIRST EMBODIMENT

Figure 2:
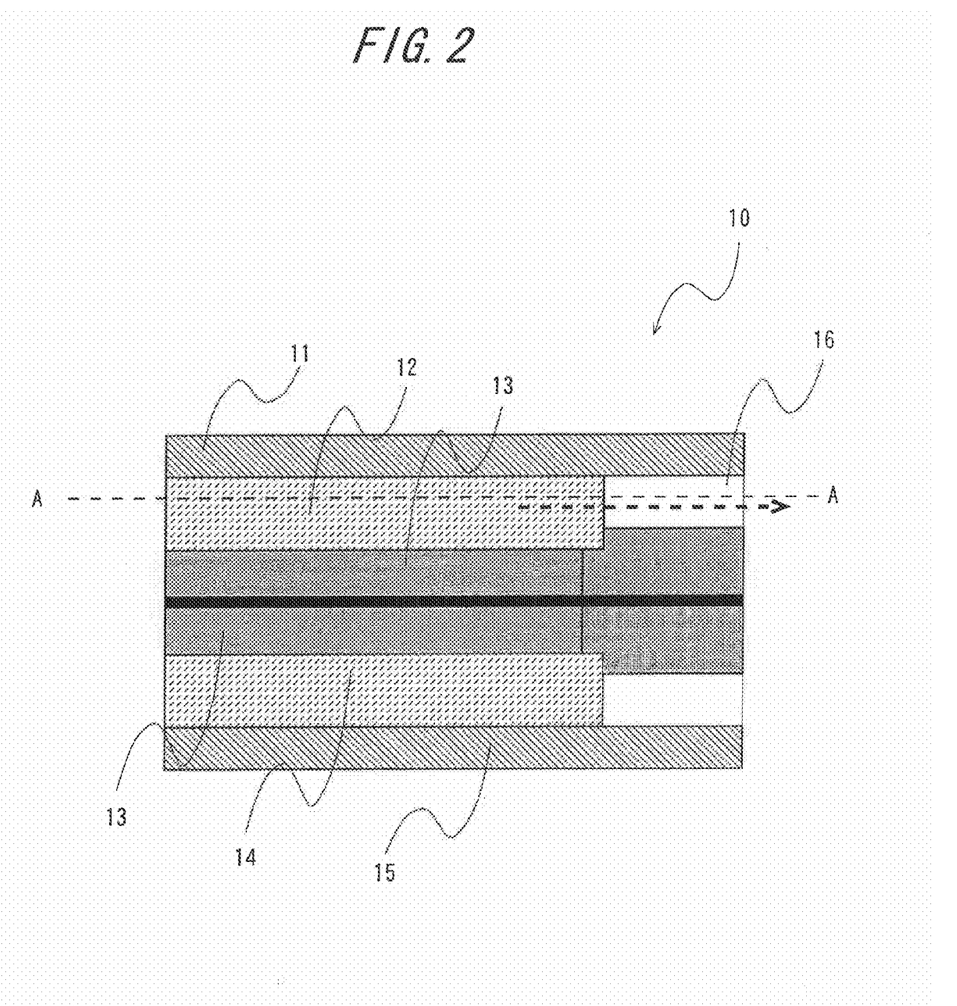
FIG. 2 is an enlarged cross-sectional view showing the schematic configuration of the fuel cell in the embodiment.
Figure 3:
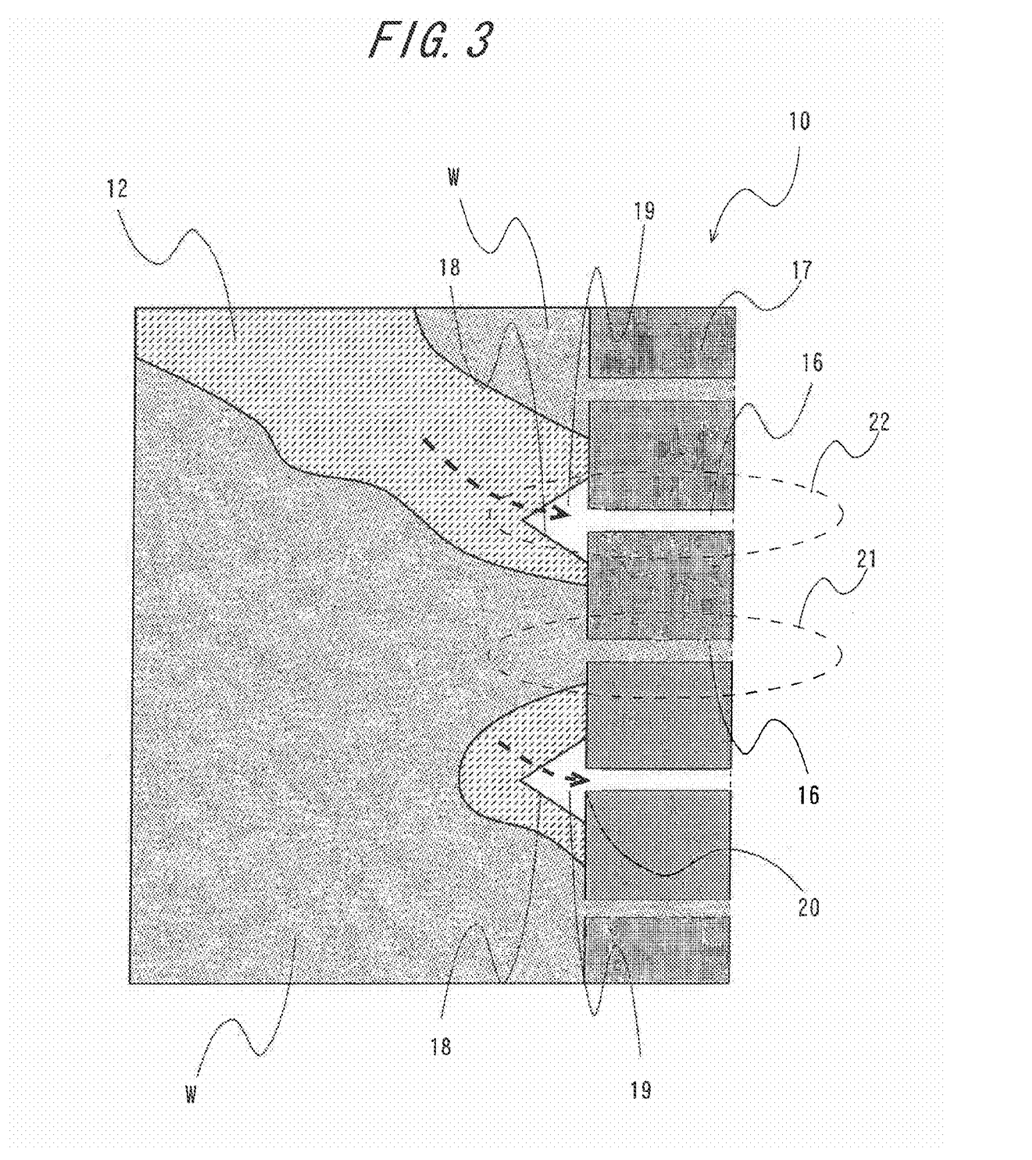
FIG. 3 is a cross-sectional view of the fuel cell shown in FIG. 2, taken on the line of A-A.

FIG. 2 is an enlarged cross-sectional view showing the schematic configuration of the fuel cell 10 in the present embodiment. FIG. 3 is a cross-sectional view of the fuel cell 10 shown in FIG. 2, taken on the line of A-A. In the present embodiment, the discharge flow path 16 is formed by a groove provided in a pectinated member 17.

The pectinated member 17 has a plurality of discharge flow paths 16, and is connected to the side surface of the cathode side porous body 12. Note that among the plurality of discharge flow paths 16, inlets 20 of some of the discharge flow paths 16 are connected to the cathode side porous body 12 via hollow portions 19 that are emerged by notches 18 provided at the cathode side porous body 12.

Areas indicated by symbols of W in FIG. 3 represent portions with liquid therein in the cathode side porous body 12 and discharge flow paths 16. Also, dotted lines with arrows indicate paths for offgas. Liquid and offgas in the cathode side porous body 12 are passed through spaces in the cathode gas porous body 12, through the discharge flow paths 16 thereafter, and then are discharged out of the fuel cell 10.

Liquid has the property of being continuous due to its viscosity and of flowing continuously through the path through which the liquid once has passed. Thus, in a path where the cathode side porous body 12 is connected to the inlet 20 of the discharge flow path 16 with no hollow portion 19 therebetween (hereinafter referred to as "first path 21"), liquid in the cathode side porous body 12 and liquid in the discharge flow path 16 will be discharged in a continuous manner. That is, the first path 21 corresponds to the first discharge means of the present invention.

On the other hand, in a path where the cathode side porous body 12 is connected to the discharge flow path 16 via the hollow portion 19 therebetween (hereinafter referred to as "second path 22"), liquid in the cathode side porous body 12 and liquid in the discharge flow path 16 will not be continuous. In other words, with the hollow portion 19 functioning as a gas-liquid separator, liquid is preferentially discharged from the first path 21 and offgas is preferentially discharged from the second path 22. That is, the second path 22 corresponds to the second discharge means of the present invention.

Additionally, once separated, the path for liquid and the path for offgas are likely to last from then on, so that the first path 21 and the second path 22 can undertake their respective roles continuously.

In order to perform the function described above, the hollow portion 19 has a space of such a size that can prevent liquid of an amount of general existence in the cathode side porous body 12 from becoming continuous due to its viscosity.

Additionally, in the present embodiment, the first path 21 and the second path 22 are provided in an alternate manner. By providing the first path 21 and the second path 22 in an alternate manner, it is possible to arrange the path 21 for preferential discharge of liquid and the path 22 for preferential discharge of gas in a well-balanced distributed manner, thereby allowing for appropriate discharge of liquid and offgas from within the cathode side porous body 12.

In the present embodiment, the first discharge means and the second discharge means according to the present invention are provided at least on the cathode side. This is because it is on the cathode side that product water is generated along with generation of power. However, the first discharge means and the second discharge means may also be provided on the anode side, since water content may be supplied to the anode side along with fuel gas, and product water generated on the cathode side may sometimes seep over the membrane electrode assembly 13 into the anode side.

Figure 4:
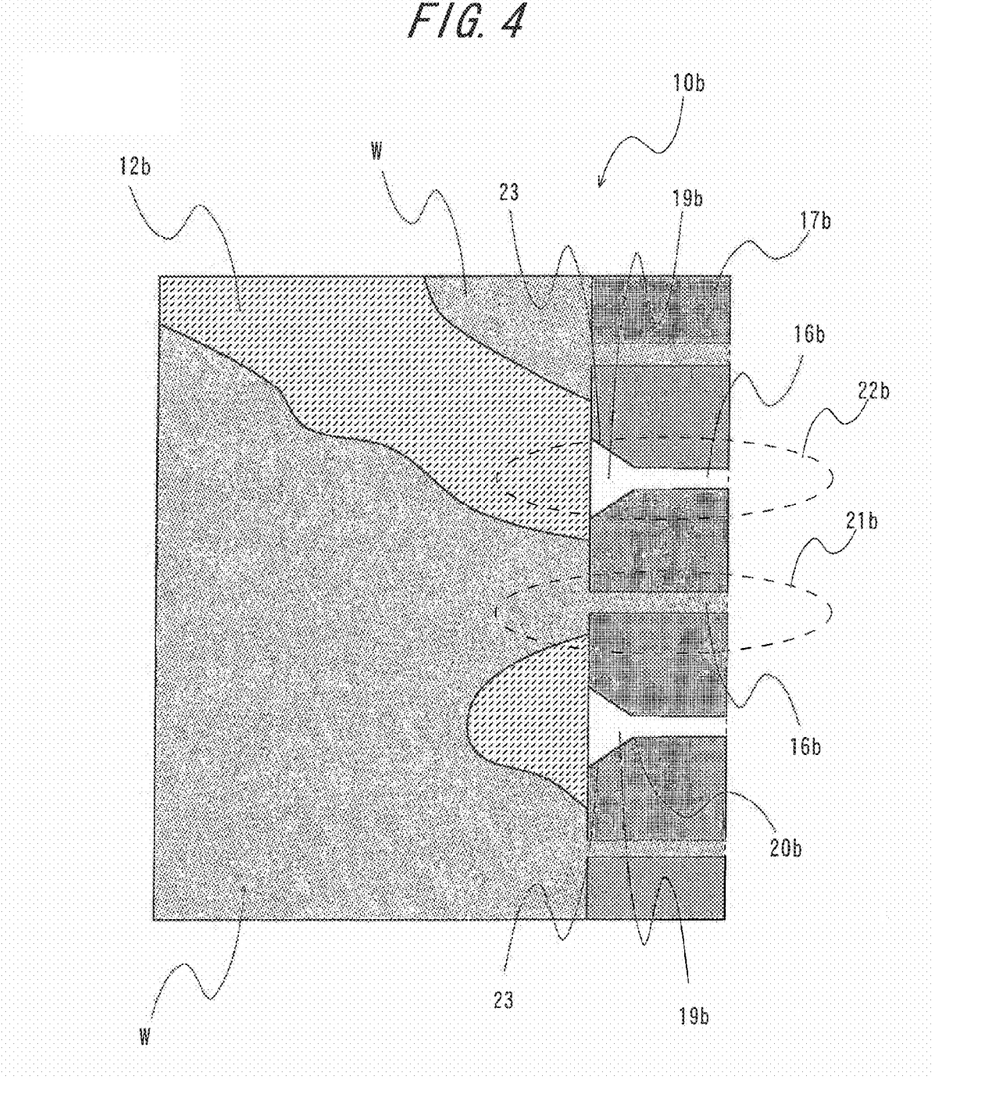
FIG. 4 is a cross-sectional view showing the schematic configuration of a fuel cell in another embodiment.

Note that the hollow portion is not necessarily formed of a notch provided at the porous body, but may alternatively be formed by a concave portion 23 provided on the pectinated member 17b side (see FIG. 4). Even with such configuration, it is possible to separate and discharge liquid and gas and to prevent most of the discharge flow paths 16 from being clogged by the liquid.

SECOND EMBODIMENT

Figure 5:
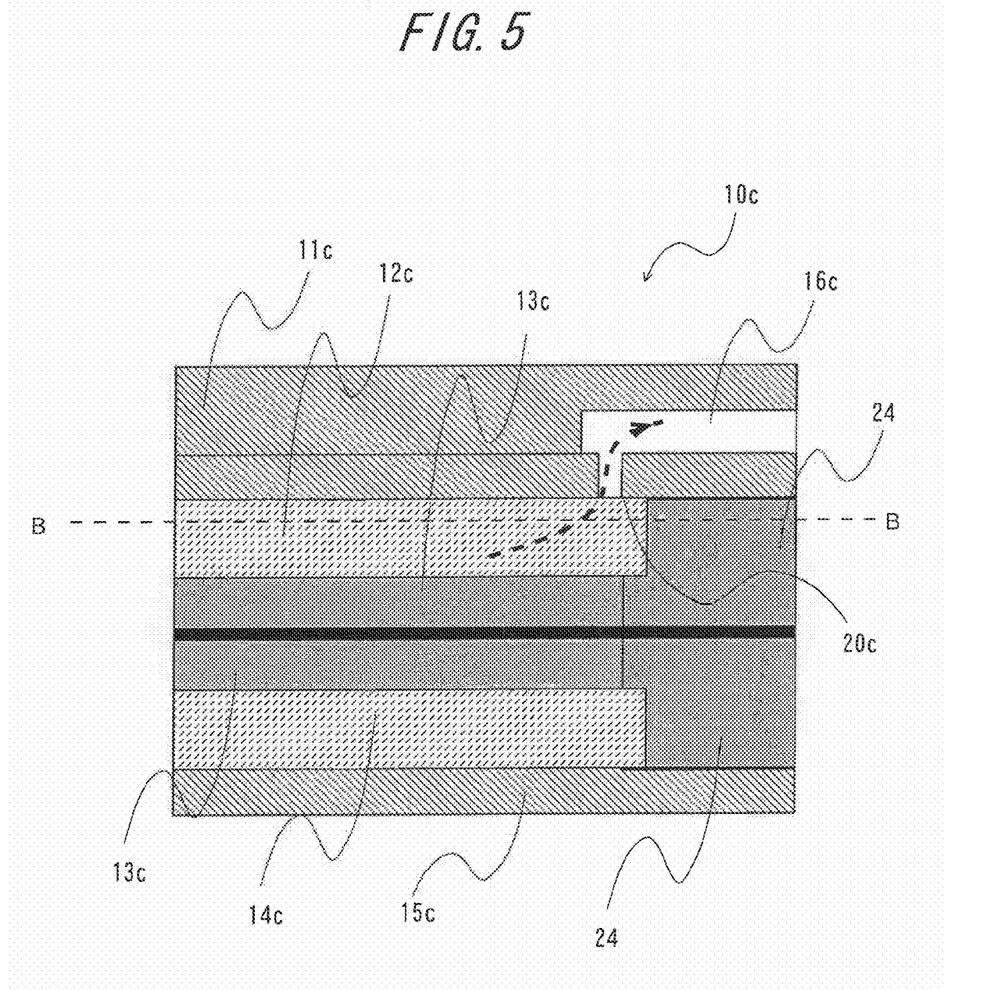
FIG. 5 is an enlarged cross-sectional view showing the schematic configuration of the fuel cell in the embodiment.

FIG. 5 is an enlarged cross-sectional view showing the schematic configuration of a fuel cell 10c in the present embodiment. In the present embodiment, a discharge flow path 16c is formed by a L-shaped hole provided at a separator 11c.

The fuel cell in the present embodiment has a gasket 24 at the edge of the fuel cell. In case of such configuration, it is difficult to provide a discharge flow path at the edge portion of a cathode side porous body 12c, so that an inlet 20c of the discharge flow path 16c is provided on the upper surface of the cathode side porous body 12c. Hereinafter, the structure, in which an inlet of a discharge flow path is placed on the upper surface of a porous body so as to configure a L-shaped flow path for introducing offgas and liquid in a direction toward the side surface of a fuel cell, is referred to as "submarine structure".

Figure 6:
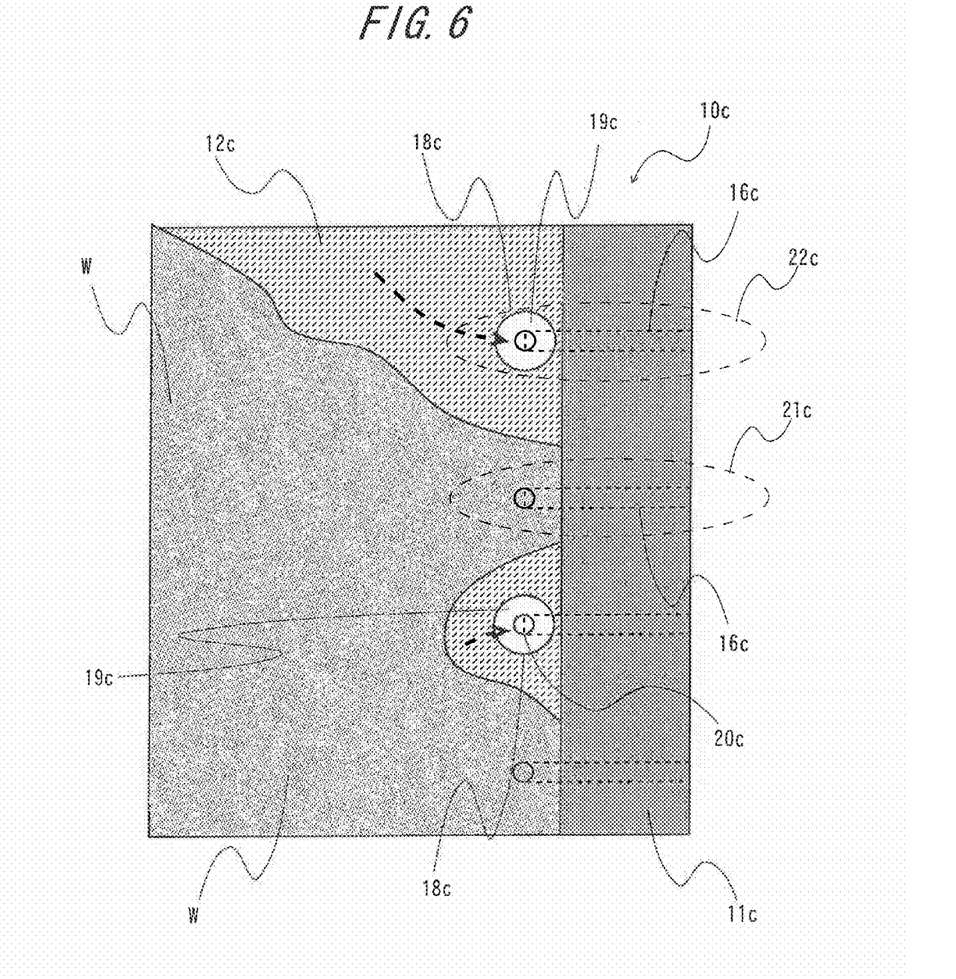
FIG. 6 is a cross-sectional view of the fuel cell shown in FIG. 5, taken on the line of B-B.

FIG. 6 is a cross-sectional view of the fuel cell 10c shown in FIG. 5, taken on the line of B-B. The separator 11c has a plurality of discharge flow paths 16c and is connected to the upper surface of the cathode side porous body 12c. Note that among the plurality of discharge flow paths 16c, inlets 20c of some of the discharge flow paths 16c are connected to the cathode side porous body 12c via hollow portions 19c that are emerged by notches 18c provided in the cathode side porous body 12c.

That is, a first path 21c, in which the cathode side porous body 12c is connected to the inlet 20c of the discharge flow path 16c with no hollow portion 19c therebetween, corresponds to the first discharge means of the present invention; whereas a second path 22, in which the cathode side porous body 12c is connected to the discharge flow path 16c via the hollow portion 19c therebetween, corresponds to the second discharge means of the present invention.

Here, the notch 18c preferably has such a size that the hollow portion 19c formed by this notch 18c is capable of gas-liquid separation and that does not reach the membrane electrode assembly 13c. If the notch 18c has such a size that reaches the membrane electrode assembly 13c, then liquid within the cathode side porous body 12c may be motionally-restricted, which may possibly prohibit well-balanced discharge of liquid and gas.

According to the present embodiment, in the type of fuel cell that has the gasket 24 and thus has the discharge flow paths 16c of submarine structure, it is also possible to prevent the discharge flow paths 16c from being clogged, to separate offgas and liquid, and to discharge offgas and liquid in a well-balanced manner.

As in the first embodiment, the first discharge means and the second discharge means may also be provided on the anode side in the present embodiment. Additionally, note that the hollow portion is not necessarily be formed by a notch provided at the porous body, but may alternatively be formed by a concave portion (not shown) provided in the vicinity of the inlet of the discharge flow path.

The invention claimed is:

1. A fuel cell including:
a porous body disposed on a surface of a membrane electrode assembly, the porous body being a flow path for reaction gas;
a plurality of discharge flow paths connected to the porous body that pass offgas and liquid discharged from the porous body;
a first path that connects a first discharge flow path of the plurality of discharge flow paths to the porous body and that causes liquid in the porous body and liquid in the first discharge flow path to be continuous due to viscosity of liquid, thereby discharging the liquid in the porous body to the first discharge flow path in preference to the offgas; and
a second path that connects a second discharge flow path of the plurality of discharge flow paths to the porous body and that prevents liquid in the porous body and liquid in the second discharge flow path from becoming continuous due to viscosity of liquid, thereby discharging the offgas to the second discharge flow path in preference to the liquid in the porous body,
wherein the first path includes an inlet of the first discharge flow path that directly connects to the porous body, thereby causing liquid in the porous body and liquid in the first discharge flow path to be continuous due to viscosity of liquid, and
the second path includes an inlet of the second discharge flow path that is separated from the porous body by a hollow portion of a predetermined size, thereby preventing liquid in the porous body and liquid in the second discharge flow path from becoming continuous due to viscosity.

2. A fuel cell in accordance with claim 1, wherein the second path connects the second discharge flow path to the porous body via a hollow portion that includes a notch on the surface of the porous body, or alternatively, via a hollow portion that includes a concave portion provided in the vicinity of the inlet of the discharge flow path.

3. A fuel cell in accordance with claim 1, wherein the first path and the second path are arranged in a uniformly distributed manner with respect to the plurality of discharge flow paths.

4. A fuel cell in accordance with claim 1, wherein the first path and the second path connect the discharge flow paths to the porous body on an oxidation gas electrode side.

5. A fuel cell in accordance with claim 2, wherein the first path and the second path are arranged in a uniformly distributed manner with respect to the plurality of discharge flow paths.

6. A fuel cell in accordance with claim 2, wherein the first path and the second path connect the discharge flow paths to the porous body on an oxidation gas electrode side.

7. A fuel cell in accordance with claim 3, wherein the first path and the second path connect the discharge flow paths to the porous body on an oxidation gas electrode side.

8. A fuel cell in accordance with claim 5, wherein the first path and the second path connect the discharge flow paths to the porous body on an oxidation gas electrode side.

9. A fuel cell in accordance with claim 1, wherein a width of the hollow portion is greater than a width of the inlet of the second discharge flow path.

* * * * *